US010213918B2

(12) United States Patent
Hashimoto et al.

(10) Patent No.: US 10,213,918 B2
(45) Date of Patent: Feb. 26, 2019

(54) DUAL-ARM ROBOT

(71) Applicant: KAWASAKI JUKOGYO KABUSHIKI KAISHA, Kobe-shi, Hyogo (JP)

(72) Inventors: Yasuhiko Hashimoto, Kobe (JP); Takahiro Inada, Kakogawa (JP); Kenji Bando, Nishinomiya (JP); Yoshiaki Tanaka, Akashi (JP); Junichi Murakami, Kobe (JP); Satoru Hibino, Kobe (JP); Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/539,824

(22) PCT Filed: Dec. 26, 2014

(86) PCT No.: PCT/JP2014/006493
§ 371 (c)(1),
(2) Date: Jun. 26, 2017

(87) PCT Pub. No.: WO2016/103302
PCT Pub. Date: Jun. 30, 2016

(65) Prior Publication Data
US 2017/0341224 A1 Nov. 30, 2017

(51) Int. Cl.
*B25J 9/06* (2006.01)
*B25J 17/02* (2006.01)
(Continued)

(52) U.S. Cl.
CPC ............... *B25J 9/06* (2013.01); *B25J 9/043* (2013.01); *B25J 17/0258* (2013.01); *B25J 18/00* (2013.01)

(58) Field of Classification Search
CPC ........... B25J 9/06; B25J 18/00; B25J 17/0258
See application file for complete search history.

(56) References Cited

U.S. PATENT DOCUMENTS

| 5,042,774 A | 8/1991 | Kakinuma |
| 5,584,647 A * | 12/1996 | Uehara ................ B25J 9/042 |
| | | 901/15 |

(Continued)

FOREIGN PATENT DOCUMENTS

| JP | S59-7573 A | 1/1984 |
| JP | S63-077674 A | 4/1988 |

(Continued)

OTHER PUBLICATIONS

Mar. 31, 2015 Search Report issued in International Patent Application No. PCT/JP2014/006493.

(Continued)

*Primary Examiner* — Victor L MacArthur
(74) *Attorney, Agent, or Firm* — Oliff PLC

(57) ABSTRACT

A dual-arm robot includes a first arm and a second arm, each having a first link rotatable about a first axis, and a second link rotatably coupled to the first link and defined with an end effector attaching portion. The first link of the first arm is disposed to be separated from the first link of the second arm in an extending direction of the first axis. Further, the second link of the first arm and the second link of the second arm are disposed so as to be located between the first link of the first arm and the first link of the second arm in the extending direction of the first axis and so that the end effector attaching portions are located at substantially the same position in the extending direction of the first axis.

5 Claims, 3 Drawing Sheets

(51) Int. Cl.
  *B25J 18/00* (2006.01)
  *B25J 9/04* (2006.01)

(56) References Cited

U.S. PATENT DOCUMENTS

| | | | |
|---|---|---|---|
| 7,383,751 B2 | 6/2008 | Hashimoto et al. | |
| 8,016,542 B2* | 9/2011 | Cox | H01L 21/67742 74/490.01 |
| 8,376,685 B2* | 2/2013 | Pietrantonio | B25J 9/042 74/490.01 |
| 8,918,203 B2* | 12/2014 | Gilchrist | B25J 9/042 414/217 |
| 9,147,590 B2* | 9/2015 | Pietrantonio | B25J 9/042 |
| 2006/0099063 A1* | 5/2006 | Pietrantonio | B25J 9/042 414/744.5 |
| 2008/0298945 A1* | 12/2008 | Cox | H01L 21/67742 901/28 |
| 2012/0141235 A1 | 6/2012 | Krupyshev et al. | |

FOREIGN PATENT DOCUMENTS

| | | |
|---|---|---|
| JP | H02-198782 A | 8/1990 |
| JP | H07-276271 A | 10/1995 |
| JP | 2699510 B2 | 1/1998 |
| JP | H11-291184 A | 10/1999 |
| JP | 2002-273681 A | 9/2002 |
| JP | 2005039047 A | 2/2005 |
| JP | 2008-264980 A | 11/2008 |

OTHER PUBLICATIONS

Mar. 31, 2016 Written Opinion issued in International Patent Application No. PCT/JP2014/006493.
Aug. 29, 2018 Extended European Search Report issued in European Patent Application No. 14908913.8.

* cited by examiner

DUAL-ARM ROBOT

TECHNICAL FIELD

The present invention relates to a dual-arm robot including two robotic arms.

BACKGROUND ART

Conventionally, two-arm robots (also referred to as "double-arm robot," "dual-arm robot") including two robotic arms for one supporting body are known. For example, FIG. 2 of Patent Document 1 illustrates an industrial robot including a plurality of robotic arms disposed on a support which is provided to stand on a fixed pedestal, so as to have a given difference in height position in a vertical relationship. Each of the plurality of robotic arms is configured to be horizontally rotatable and extendable independently to each other.

REFERENCE DOCUMENT OF CONVENTIONAL ART

Patent Document

[Patent Document 1] JP1984-007573A

DISCLOSURE OF THE INVENTION

Problems to be Solved by the Invention

In such a two-arm robot described above, the two left and right robotic arms can work independently to or in cooperation with each other. At the time of the work, an end effector corresponding to the work is attached to a tip end portion of each robotic arm. One example of the cooperative work of the two robotic arms is a conveyance work in which the two end effectors hold a plate-shaped workpiece at two points and convey this plate-shaped workpiece. In this conveyance work, for example, by aligning the height positions of the operating points of the two end effectors on the plate-shaped workpiece, the plate-shaped workpiece is conveyed while keeping a horizontal posture.

In the conventional two-arm robot described in Patent Document 1, since base parts of the two robotic arms are disposed on the same axis, the height positions of first links of the two robotic arms cannot be matched with each other. Additionally, height positions of a tip end portion of one of the robotic arms and a tip end portion of the other robotic arm are also different from each other. Therefore, a cylinder of one of the end effectors and a cylinder of the other end effector are provided with a difference in length from each other so that descending limits of the height positions of the two end effectors become the same as each other.

When the height positions of the tip end portions of the two robotic arms are different as described above, the structures of the two end effectors are different. Therefore, in maintenance or replacement, there is a problem that an adjustment of the two end effectors becomes complex. Moreover, when customizing the two end effectors according to a user's request, end effectors with different structures need to be designed, which causes problems of an increase in kinds of parts and a difficulty in cost reduction.

The present invention is made in view of the above situations and aims to reduce at least one of the problems of the conventional arts.

SUMMARY OF THE INVENTION

According to one aspect of the present invention, a dual-arm robot includes a first arm and a second arm, each having a first link rotatable about a first axis, and a second link rotatably coupled to the first link and defined with an end effector attaching portion, wherein, the first link of the first arm is disposed to be separated from the first link of the second arm in an extending direction of the first axis, and the second link of the first arm and the second link of the second arm are disposed so as to be located between the first link of the first arm and the first link of the second arm in the extending direction of the first axis and so that the end effector attaching portions are located at substantially the same position in the extending direction of the first axis.

Effect of the Invention

In the dual-arm robot according the present invention, height positions of the end effector attaching portions of the first arm and the second arm are matched with each other. Therefore, each of the end effector attaching portions of the first arm and the second arm can be attached with an end effector which has the same structure.

MODE FOR CARRYING OUT THE INVENTION

Next, one embodiment of the present invention is described with reference to the accompanying drawings. A dual-arm robot according to one embodiment of the present invention is provided to an assembly line of electric, electronic parts etc., and is for performing at least one of conveyance, attachment and rearrangement of parts, posture change, etc. on a work delivered along the line. In such a dual-arm robot, in order to increase versatility, end effectors attached to the robotic arms are replaced according to the work.

Figure 1:
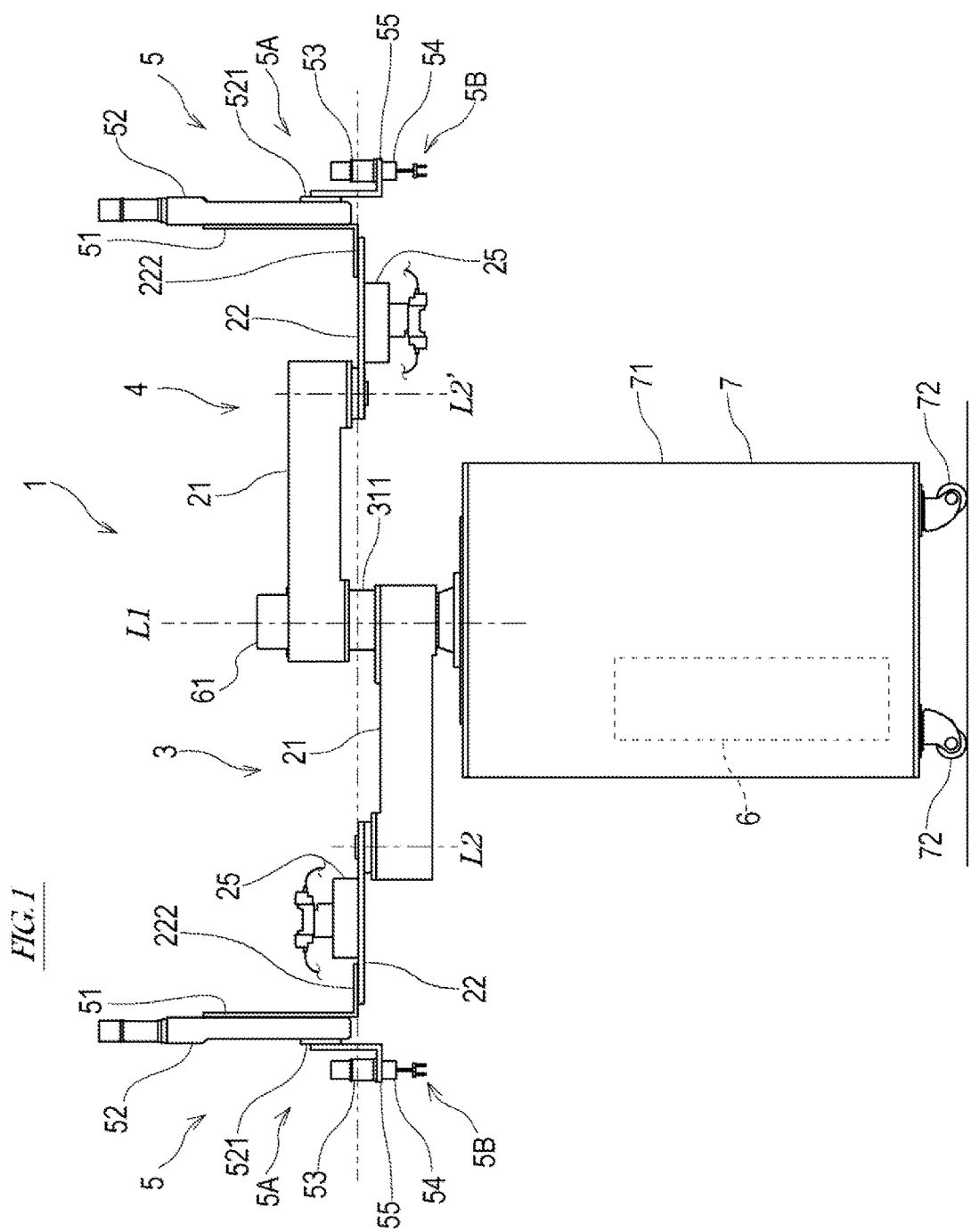
FIG. 1 is a front view illustrating an entire schematic structure of a dual-arm robot according to one embodiment of the present invention.
Figure 2:
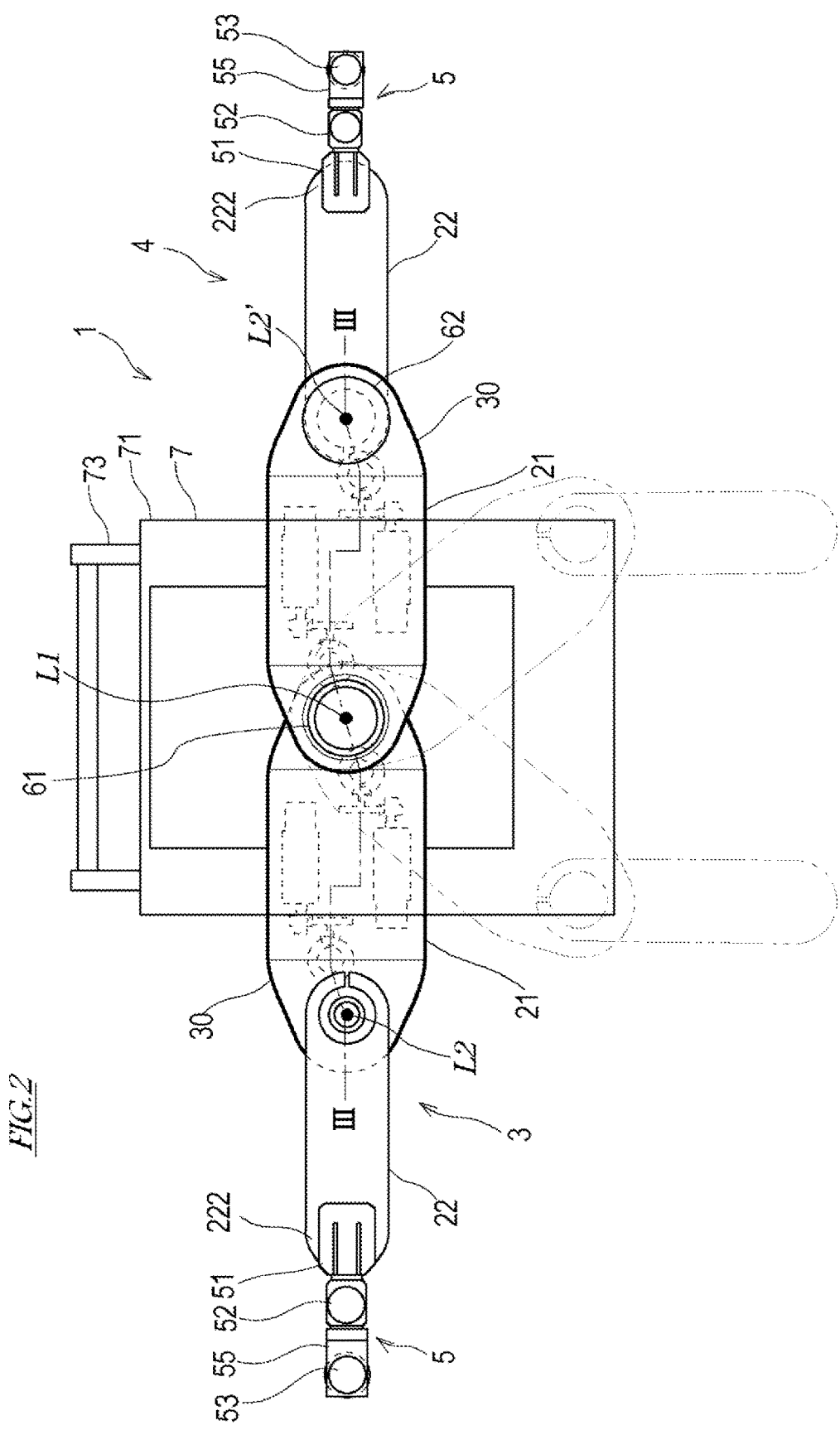
FIG. 2 is a plan view illustrating a schematic structure of the dual-arm robot illustrated in FIG. 1.

FIG. 1 is a front view illustrating an entire structure of the dual-arm robot of one embodiment of the present invention, and FIG. 2 is a plan view of the dual-arm robot illustrated in FIG. 1. As illustrated in FIGS. 1 and 2, the dual-arm robot 1 of one embodiment of the present invention includes a carriage 7, two robotic arms 3 and 4 supported by the carriage 7, and a controller 6 for controlling operations of the two robotic arms 3 and 4. An end effector 5 is detachably attached to a tip end portion of each of the robotic arms 3 and 4. The operations of these end effectors 5 are also controlled by the controller 6. Hereinafter, the respective components of the dual-arm robot 1 are described in detail.

First, the carriage 7 is described. The carriage 7 includes a housing 71 having a cuboid shape, a plurality of wheels 72 provided to a lower surface of the housing 71, and a handle 73 provided on a back surface of the housing 71. The housing 71 is hollow and provided therein with the control unit 6, an air pressure supply device (not illustrated), etc.

Next, the two robotic arms 3 and 4 are described. Each of the two robotic arms 3 and 4 includes a first link 21 for rotating about a first axis L1 and a second link 22 coupled to a tip end portion of the first link 21. The first axes L1 of the first links 21 of the two robotic arms 3 and 4 match with each other, and the first link 21 of one robotic arm 3 and the first link 21 of the other robotic arm 4 are disposed at vertically different positions. Hereinafter, one of the two robotic arms 3 and 4 in which the first link 21 is located lower is referred to as the first arm 3, and the other robotic arm is referred to as the second arm 4.

First, the first arm 3 is described in detail. The first arm 3 includes the first link 21 coupled to the carriage 7 to be rotatable about the first axis L1, and the second link 22 coupled to the first link 21 to be rotatable about a second axis L2 defined in the tip end portion of the first link 21. The first axes L1 are parallel to the second axis L2, and the first axes L1 and the second axis L2 of this embodiment extend vertically.

Figure 3:
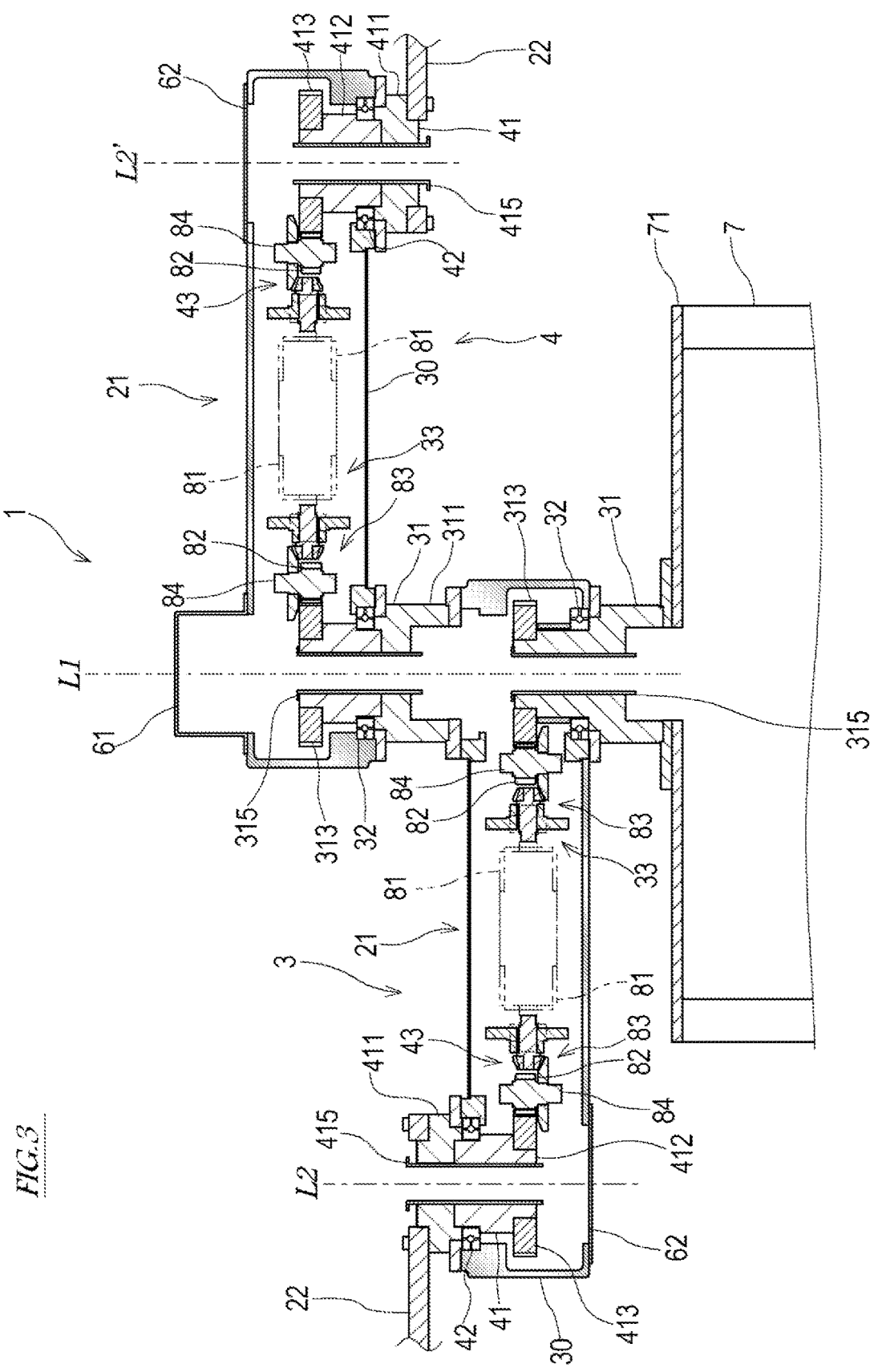
FIG. 3 is a III-III cross-sectional view of FIG. 2, illustrating a schematic structure of a power transmission of the dual-arm robot.

FIG. 3 is a III-III cross-sectional view of FIG. 2, illustrating a schematic structure of a power transmission of the dual-arm robot. As illustrated in FIG. 3, the first link 21 includes a link member 30, a first shaft 31 through which the first axis L1 passes through its axis, a bearing 32 for rotatably coupling the link member 30 to the first shaft 31, and a first drive unit 33 for rotating the link member 30 about the first axis L1 in relation to the first shaft 31. Desirably, the link member 30 is rotatable 360° about the first axis L1.

The link member 30 is a hollow box body elongated in a horizontal direction. An upper part of the first shaft 31 is inserted into a base end portion of the link member 30 from a lower surface of the link member 30, and the link member 30 is rotatably supported by the first shaft 31 via the bearing 32. A gear 313 is fitted and fixed onto the upper part of the first shaft 31 inside the link member 30.

The first shaft 31 is shaped into a hollow shaft as a whole, and a bush 315 is inserted into the hollow section. An inner circumferential side of the bush 315 is used as space for wiring and piping. Although the bush 315 of this embodiment has a uniform inner diameter, the bush 315 may be a hollow-shaft-shaped body having an upper portion of which inner diameter gradually enlarges upwardly in a so-called trumpet shape. As a result, friction of the wiring and piping with the bush 315 is reduced, which prevents damages of the wiring and piping.

The first drive unit 33 is provided inside the link member 30. The first drive unit 33 typically includes a servomotor 81 as a driving source, and a power transmission mechanism 83 for transmitting an output of the servomotor 81 to the gear 313 of the first shaft 31 via an output gear 82 meshed with the gear 313 of the first shaft 31. The output gear 82 is fixed to or integrally formed with an output shaft 84 rotatably supported by the link member 30. The power transmission mechanism 83 is comprised of a plurality of gears and also has a function as a decelerator for reducing the rotational speed of the motor output and outputting it to the output gear 82. Note that, operation of the first drive unit 33 is controlled by the controller 6, and cables connecting the first drive unit 33 with the controller 6 pass through the link member 30 and the bush 315 of the first shaft 31.

The first link 21 further includes a second shaft 41 having the second axis L2 passing through its axis, a bearing 42 rotatably coupling the second shaft 41 to the link member 30, and a second drive unit 43 for rotating the second shaft 41 about the second axis L2 with respect to the link member 30.

A lower part of the second shaft 41 is inserted into an upper surface of a tip end portion of the link member 30, and the second shaft 41 is rotatably supported by the link member 30 via the bearing 42. Desirably, the second shaft 41 is rotatable 360° about the second axis L2 with respect to the link member 30.

The second shaft 41 is integrally formed or configured to be dividable. In this embodiment, the second shaft 41 is formed by joining a part 411 projecting outside the link member 30 to a part 412 inserted into the link member 30, so that they are arranged in line in the extending direction of the axis of the second shaft 41. A gear 413 is fitted and fixed onto the part 412 inserted into the link member 30 of the second shaft 41. The second shaft 41 is shaped into a hollow shaft as a whole, and a bush 415 is inserted into the hollow section. An inner circumferential side of the bush 415 is used as space for wiring and piping.

A base end portion of the second link 22 is fixed to the part 411 projecting outside the link member 30 of the second shaft 41. This second link 22 behaves integrally with the second shaft 41 and is driven by the second drive unit 43 to rotate about the second axis L2. The second link 22 is a plate-shaped member elongated in a horizontal direction, and an end effector attaching portion 222 for detachably attaching the end effector 5 is defined in an upper surface of a tip end portion of the second link 22. The end effector attaching portion 222 of this embodiment is formed with a fastening hole (not illustrated) for fastening a bracket 51 described later.

The second drive unit 43 is provided inside the link member 30. The second drive unit 43 has substantially the same configuration as the first drive unit 33. The same reference characters are provided to the members of the first drive unit 33 and the second drive unit 43 having common functions therebetween. The second drive unit 43 typically includes a servomotor 81 as a driving source, and a power transmission mechanism 83 for transmitting an output of the servomotor 81 to the gear 413 of the second shaft 41 via an output gear 82 meshed with the gear 413 of the second shaft 41.

An opening formed in an upper surface of the carriage 7 and the bush 315 of the first shaft 31 provided to stand in the opening communicate the inside of the first link 21 with the inside of the carriage 7. Further, the bush 415 of the second shaft 41 communicates the inside and outside of the first link 21 with each other. Thus, the spaces inside the carriage 7 and the first link 21 are communicated with each other, and these spaces are used for wiring and piping. The second link 22 is provided with a wiring base 25 for bundling the wiring and piping passing through the first link 21 from the carriage 7 and pulled out from the tip end portion of the second link 22.

In the first arm 3 having the above structure, when the output gear 82 of the first drive unit 33 is rotated by the power transmitted from the servomotor 81, the output gear 82 rotates around the gear 313. Thus, the link member 30 supporting the output gear 82 rotates about the first axis L1 with respect to the first shaft 31. Further in the first arm 3 having the above structure, when the output gear 82 of the output drive unit 43 is rotated by the power transmitted from the servomotor 81, the gear 413 meshed with the output gear 82 rotates. Thus, the second shaft 41 which behaves integrally with the gear 413 and the second link 22 which is fixed to the second shaft 41 rotate about the second axis L2 with respect to the link member 30.

Next, the second arm 4 is described in detail. The second arm 4 includes the first link 21 for rotating about the first axis L1 and the second link 22 coupled to the first link 21 to be rotatable about a second axis L2' defined at the tip end portion of the first link 21. The first axis L1 and the second axis L2' are parallel to each other.

The second arm 4 is different from the first arm 3 in that the second shaft 41 of the first link 21 projects upward from the link member 30 in the first arm 3, whereas in the second arm 4, the second shaft 41 of the first link 21 projects downward from the link member 30. Except for this difference, the second arm 4 and the first arm 3 have substantially the same structure. Therefore, a further detailed description of the structure of the second arm 4 is omitted by providing common reference characters to the components already described in terms of the first arm 3.

The first shaft 31 of the first link 21 of the second arm 4 having the above structure is disposed to match with the first axis L1 of the first arm 3, and is fixed to an upper surface of a base end portion of the first link 21 of the first arm 3. A lower part 311 of the first shaft 31 of the first link 21 of the second arm 4 has both of a function as a support member for supporting the link member 30 of the second arm 4 and a function as a spacer for separating the first link 21 of the first arm 3 and the first link 21 of the second arm 4 from each other in the extending direction of the first axes L1.

Next, the end effectors 5 are described. The end effectors 5 used have a suitable structure according to the work performed by the dual-arm robot 1. Therefore, one example of the end effectors 5 is briefly described here. Each of the end effectors 5 of this embodiment is typically comprised of a wrist part 5A and a tool part 5B provided at a tip end portion of the wrist part 5A. The wrist part 5A has an elevation function for moving the tool part 5B in the up-and-down directions in the vertical axis and a rotation function for rotating the tool part 5B about the vertical axis.

For example, the wrist part 5A is comprised of the bracket 51 detachably attached to the end effector attaching portion 222 of the second link 22 by a fastener etc., a linear guide 52 fixed to the bracket 51, a stay 55 fixed to a slider 521 of the linear guide 52, a servomotor 53 supported by the stay 55, and a decelerator 54 coupled to an output shaft of the servomotor 53. Further, the tool part 5B corresponding to the work is attached to an output shaft of the decelerator 54.

As described above, the dual-arm robot 1 of this embodiment includes two robotic arms of the first arm 3 and the second arm 4. Each of the first and second arms 3 and 4 has the first link 21 rotatable about the first axis L1, and the second link 22 rotatably coupled to the first link 21 and defined with the end effector attaching portion 222. In the first and second arms 3 and 4, since the first axes L1 of the first links 21 are on the same axis, compared with a case where the first axes L1 of the first links 21 are on different axes, the installation space of the dual-arm robot 1 is reducible.

Further, in the dual-arm robot 1 of this embodiment, the first link 21 of the first arm 3 is disposed to be separated from the first link 21 of the second arm 4 in the extending direction of the first axes L1 by the lower part 311 of the first shaft 31 of the second arm 4 which functions as the spacer. Moreover, the second link 22 of the first arm 3 is supported by the second shaft 41 (first projecting member) projecting toward the first link 21 of the second arm 4 from the first link 21 of the first arm 3, when seen from a direction orthogonal to the first axis L1. Similarly, the second link 22 of the second arm 4 is supported by the second shaft 41 (second projecting member) projecting toward the first link 21 of the first arm 3 from the first link 21 of the second arm 4, when seen from a direction orthogonal to the first axis L1. In this manner, the second link 22 of the first arm 3 and the second link 22 of the second arm 4 are disposed so as to be located between the first link 21 of the first arm 3 and the first link 21 of the second arm 4 in the extending direction of the first axes L1 and so that the end effector attaching portions 222 are located at substantially the same position in the extending direction of the first axes L1. In other words, a distance from a reference height (e.g., the upper surface of the housing 71 of the carriage 7) to the end effector attaching portion 222 of the first arm 3 in the extending direction of the first axes L1 is substantially the same as a distance from the reference height to the end effector attaching portion 222 of the second arm 4 in the extending direction of the first axes L1.

In this embodiment, since the end effector attaching portion 222 is defined in an upper surface of the second link 22 in both of the first arm 3 and the second arm 4, the second link 22 of the first arm 3 and the second link 22 of the second arm 4 are disposed to be located at substantially the same position in the extending direction of the first axes L1. In other words, a distance from the reference height to the upper surface of the second link 22 of the first arm 3 in the extending direction of the first axes L1 is substantially the same as a distance from the reference height to the upper surface of the second link 22 of the second arm 4 in the extending direction of the first axes L1.

In the dual-arm robot 1 of this embodiment, the components of the robotic arms 3 and 4 have substantially the same shapes as each other, respectively.

Moreover, the shapes of the link members 30, the length in the direction of the first axes L1 of the lower part 311 functioning as the spacer of the first shaft 31, the projection amounts of the second shafts 41 in the direction of the first axes L1, etc. are determined so that the height positions of the end effector attaching portions 222 of the robotic arms 3 and 4 become substantially the same. However, each component of the robotic arms 3 and 4 has shape and dimensional errors in manufacturing. Therefore, the positions of the end effector attaching portions 222 of the robotic arms 3 and 4 in the extending direction of the first axes L1 are adjusted to be substantially the same by a height adjustment member, such as a shim plate, provided at least one position of between the second shaft 41 and the second link 22, between the link member 30 of the first arm 3 and the first shaft 31 of the second arm 4, etc.

Since the positions of the end effector attaching portions 222 of the robotic arms 3 and 4 in the extending direction of the first axes L1 are substantially the same, the end effectors 5 attached to the robotic arms 3 and 4 can have substantially the same structure. In other words, although the first links 21 of the robotic arms 3 and 4 have the positional difference in the extending direction of the first axes L1, this difference may not be absorbed by the two end effectors 5. Note that "substantially the same structure" means that the shapes and functions of the components of the end effectors 5 are the same, and it includes end effectors 5 having the same structure, and also left-and-right symmetric structures, left-and-right inverted structures, etc. When the two end effectors 5 have substantially the same structure, an increase in the kinds of parts is prevented, maintenance such as replacement and adjustment of the parts are facilitated, and the cost can be reduced.

This is also advantageous, for example, when customizing the end effectors 5 according to a user's request.

Moreover, when the two end effectors 5 have substantially the same structure, elastic deformation amounts due to the weights of the two robotic arms 3 and 4 themselves and the weights of the end effectors 5 becomes substantially the same. Therefore, in the maintenance and replacement, an adjustment for aligning the height positions of the two end effectors 5 become easy. Furthermore, when the two robotic arms 3 and 4 work in cooperation with each other, controls of the robotic arms 3 and 4 and the end effectors 5 to align the height positions reached by the two end effectors 5 can be simplified.

Moreover, in the dual-arm robot 1 of this embodiment, the first link 21 of each of the robotic arms 3 and 4 is provided with the first shaft 31 (support member), the link member 30 supported by the first shaft 31 to be rotatable about the first axis L1, and the first drive unit 33 provided in the link member 30 and for rotating the link member 30 about the first axis L1 with respect to the first shaft 31. The first link 21 of each of the robotic arms 3 and 4 is further provided with the second shaft 41 (shaft member) supported by the link member 30 to be rotatable about the second axis L2 which is parallel to the first axis L1, and the second drive unit 43 provided in the link member 30 and for rotating the second shaft 41 about the second axis L2 with respect to the link member 30.

Thus, the mechanism for rotating the first link 21 about the first axis L1 and the mechanism for rotating the second link 22 around the second axis L2 are put together in the first link 21 of each of the robotic arms 3 and 4. Therefore, the second link 22 of each of the robotic arms 3 and 4 are formable with, for example, a simple flat-plate-shaped link member, thus the position of the end effector attaching portion 222 of each of the robotic arms 3 and 4 becomes easy to adjust.

Furthermore, in the dual-arm robot 1 of this embodiment, the first shaft 31 of the first link 21 of the second arm 4 is fixed to the link member 30 of the first link 21 of the first arm 3, and the first link 21 of the first arm 3 and the first link 21 of the second arm 4 are separated from each other in the extending direction of the first axes L1 by the first shaft 31 of the second arm 4.

Since the positioning of the first link 21 of the second arm 4 in relation to the first link 21 of the first arm 3 in the extending direction of the first axes L1 is performed by the lower part 311 of the first axis 31 of the second arm 4 as described above, the separated distance between the first links 21 is adjustable by this first shaft 31 or the connected portion between the first shaft 31 and the link member 30. Thus, the position of the end effector attaching portion 222 of each of the robotic arms 3 and 4 becomes easy to adjust.

From the above description of the preferred embodiment of the present invention, it is apparent for a person skilled in the art that many improvements and other embodiments of the present invention are possible. Therefore, the above description is to be interpreted only as illustrations, and is only provided in order to teach the person skilled in the art a best mode to implement the present invention. Details of the structures and/or the functions may substantially be changed, without departing from the spirit of the present invention.

DESCRIPTION OF REFERENCE CHARACTERS

1: Dual-arm Robot
3: Robotic arm (First Arm)
4: Robotic arm (Second Arm)
5: End Effector
6: Controller
7: Carriage
21: First Link
22: Second Link
25: Wiring Base
30: Link Member
31: First Shaft (Support Member)
32: Bearing
33: First Drive Unit
41: Second Shaft (Shaft Member)
42: Bearing
43: Second Drive Unit
51: Bracket
52: Linear Guide
53: Servomotor
54: Decelerator
55: Stay
71: Housing
72: Wheel
81: Servomotor
82: Output Gear
83: Power Transmission Mechanism
84: Output Shaft
222: End Effector Attaching Portion
313: Gear
315: Bush
413: Gear
415: Bush
L1: First Axis
L2, L2': Second Axis

What is claimed is:

1. A dual-arm robot, comprising:
a first arm and a second arm, each having a first link rotatable about a first axis, and a second link rotatably coupled to the first link and defined with an end effector attaching portion, wherein,
the first link of the first arm is disposed to be separated from the first link of the second arm in an extending direction of the first axis,
the second link of the first arm and the second link of the second arm are disposed so as to be located between a plane that is normal to the first axis and in which the first link of the first arm lies and a plane that is normal to the first axis and in which the first link of the second arm lies and so that the end effector attaching portions are located in a common plane normal to the first axis,
the second link of the first arm is supported by a hollow first shaft member protruding in parallel with the first axis from the first link of the first arm toward the first link of the second arm,
the first shaft member comprises a first portion and a second portion coupled to each other in series, the first portion is disposed inside the first link of the first arm, the second portion is disposed outside the first link of the first arm and is coupled to the second link of the first arm,
the second link of the second arm is supported by a hollow second shaft member protruding in parallel with the first axis from the first link of the second arm toward the first link of the first arm, and
the second shaft member comprises a third portion and a forth portion coupled to each other in series, the third portion is disposed inside the first link of the second arm, and the forth portion is disposed outside the first link of the second arm and is coupled to the second link of the second arm.

2. The dual-arm robot of claim 1, wherein, the second links of the first and second arms lie in a common plane normal to the first axis.

3. The dual-arm robot of claim 1, wherein the first link has a support member, a link member supported by the support member to be rotatable about the first axis, and a first drive unit provided in the link member and for rotating the link member about the first axis with respect to the support member.

4. The dual-arm robot of claim 3, wherein,
the first link has the first shaft member and the second shaft member supported by the link member to be rotatable about a second axis parallel to the first axis, and a second drive unit provided in the link member and for rotating the first shaft member and the second shaft member about the second axis with respect to the link member, and
the second link is fixed to the first shaft member and the second shaft member.

5. The dual-arm robot of claim 3, wherein the support member of the first link of the second arm is fixed to the link member of the first link of the first arm, and the first link of the first arm is separated from the first link of the second arm in the extending direction of the first axis by the support member.

\* \* \* \* \*